United States Patent [19]

Markus

[11] Patent Number: 5,315,229
[45] Date of Patent: May 24, 1994

[54] MINIMUM TIME DELAY FILTERING METHOD FOR AUTOMATIC VOLTAGE REGULATORS

[75] Inventor: David R. Markus, Monroeville, Pa.

[73] Assignee: Westinghouse Electric Corp., Pittsburgh, Pa.

[21] Appl. No.: 769,065

[22] Filed: Sep. 30, 1991

[51] Int. Cl.$^5$ .......................... H02P 9/00; H02P 9/30
[52] U.S. Cl. .......................................... 322/28; 322/25
[58] Field of Search ...................................... 322/25, 28

[56] References Cited

U.S. PATENT DOCUMENTS

| | | |
|---|---|---|
| 3,757,199 | 9/1973 | Minks ..................................... 322/28 |
| 4,245,183 | 1/1981 | Glennon ................................. 322/28 |
| 4,477,765 | 10/1984 | Glennon et al. .................. 322/25 X |

OTHER PUBLICATIONS

M6805 HMOS 146805 CMOS Family Microcomputer/Microprocessors User's Manual, published by Motorola, copyright 1980, pp. 48–49.
Detection and Measurement of Three-Phase Power, Reactive Power, and Power Factor, with Minimum Time Delay, By I. R. Smith and L. A. Snider, Proceedings of the IEEE, Nov. 1970, pp. 1866–1867.

*Primary Examiner*—R. J. Hickey
*Attorney, Agent, or Firm*—M. J. Moran

[57] ABSTRACT

An automatic voltage regulator senses and controls the terminal voltage of a separately excited generator by controlling the field current applied to the field winding. In order to improve the response time of the circuit, the circuitry relies on the phasor relationships between the generator phase voltages to obviate the need for a rectification and filtering circuit, used in known AVR's. More specifically, each of the sinusoidal phase voltages is sampled and squared. The squared phase voltages are then summed together. The square root of the sum is used to provide a DC voltage signal, proportional to the terminal phase voltages $V_A$, $V_B$ and $V_C$. The DC voltage signal may then be compared with a reference signal to generate an error signal for use in regulating the generator terminal voltage by controlling the field current applied to the generator field winding.

15 Claims, 4 Drawing Sheets

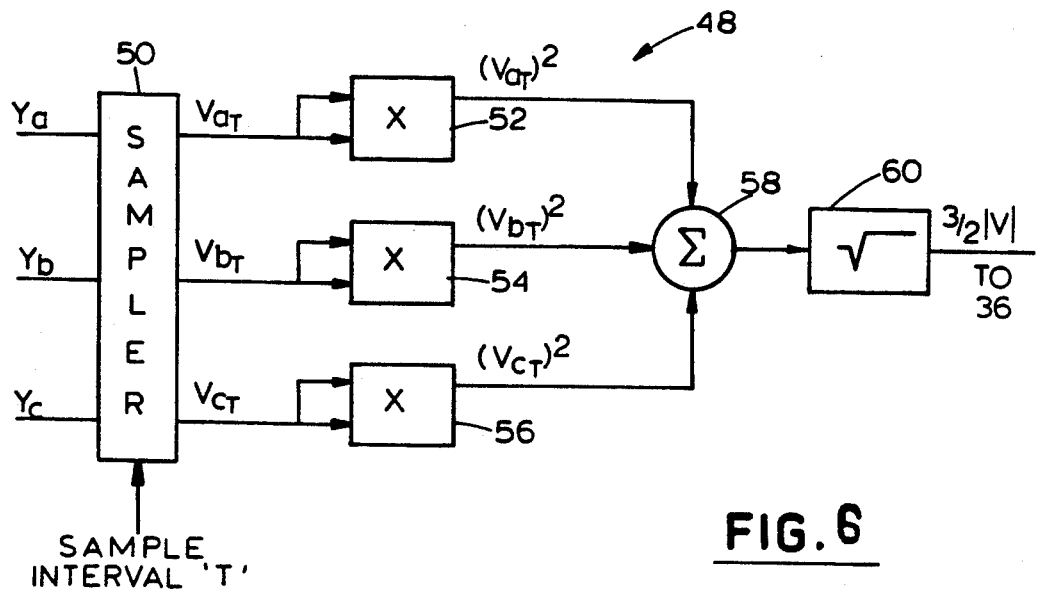
FIG. 6
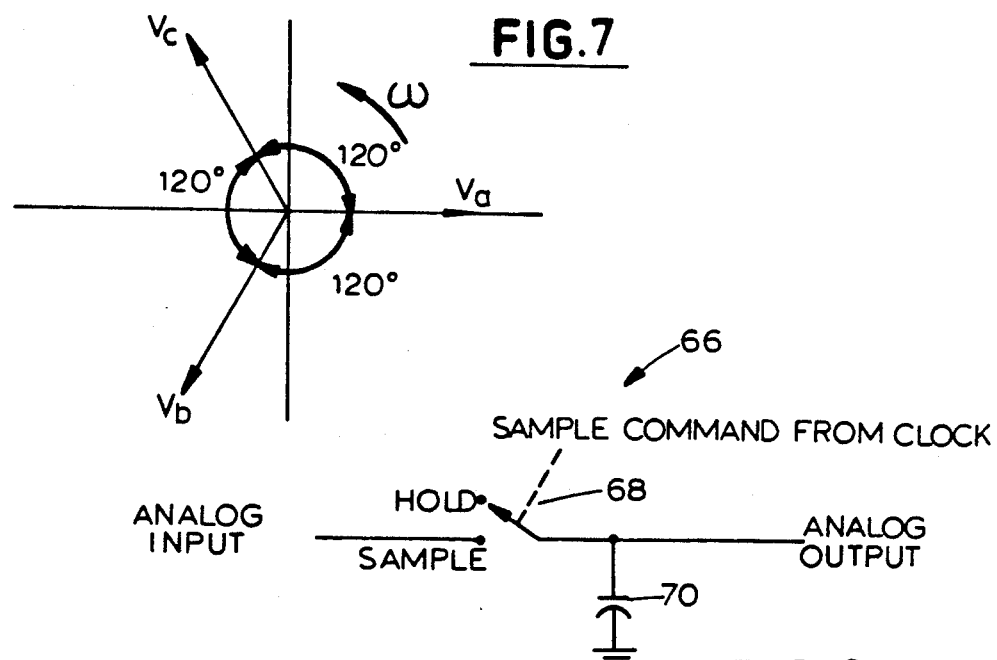
FIG. 7
FIG. 8
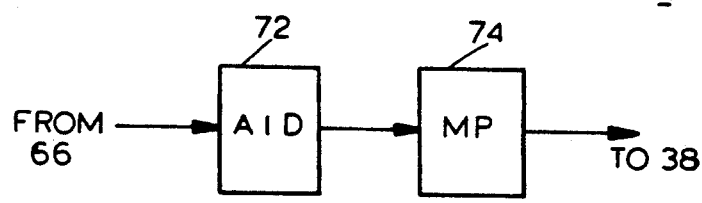
FIG. 9

MINIMUM TIME DELAY FILTERING METHOD FOR AUTOMATIC VOLTAGE REGULATORS

BACKGROUND OF THE INVENTION

1. Field of the Invention

The present invention relates to a method and apparatus for sensing electrical voltage in a polyphase electrical system and more particularly to a method and apparatus for sensing changes in amplitude of the terminal voltage of a polyphase electrical generator.

2. Description of the Prior Art

Polyphase electrical generators, normally three phase, are generally used in the generation of electrical power in a utility system. As illustrated in FIG. 1, such generators 20 are normally driven by a prime mover 22, such as a steam, gas or water turbine, rigidly attached to the generator shaft to drive the generator rotor at a predetermined speed, which establishes the frequency of the generator output voltage, known as the terminal voltage.

Since the polyphase generator is normally connected to a transmission and distribution network, it is necessary to regulate the generator terminal voltage within a predetermined range. Accordingly, such generators are normally provided as separately excited generators with a separate generator field winding 24. As is known in the art, the magnitude of the terminal voltage is a function of the field current $I_f$ applied to the generator field winding 24. Thus, in order to control the magnitude of the terminal voltage of a polyphase generator, it is necessary to control the magnitude of the field current $I_f$ applied to the generator field winding 24. Devices known as automatic voltage regulators (AVR's) are normally used to control the field current $I_f$ in order to regulate the terminal voltage. More specifically, such devices normally sense the phase voltages of an electrical generator by way of potential transformers 28 and compare the sensed phase voltages with a terminal voltage set point 30. Any difference between the sensed phase voltage and the terminal voltage set point 30 is used to create an error signal by closed loop control that is amplified, for example, by a power amplifier 32 and used to adjust the field current $I_f$ in the generator field winding 24 in order to minimize the error signal and regulate the terminal voltage of the generator 20.

A simplified block diagram of a known automatic voltage regulator 26 is illustrated in FIG. 2. In such a device, the phase voltages $V_A$, $V_B$ and $V_C$, as sensed by the potential transformers 28, are applied to a rectification and filtering circuit 34 in order to convert phase voltages, which are sinusoidal, to a suitable DC voltage that can be compared with the terminal voltage reference set point 30 by way of a comparator 36. The output of the comparator 36 defines an error signal which may then be combined with other signals by way of a signal mixing circuit 38 to control the field current $I_f$ in the generator field winding 24 to regulate the terminal voltage of the polyphase generator 20.

A known rectification and filtering circuit 34 is illustrated in FIG. 3. As shown, the rectification of the phase voltages $V_A$, $V_B$ and $V_C$ is provided by six rectification diodes 40. In order to smooth out the output signal from the rectification circuit 34, the rectified voltage is then applied to a filtering circuit 42 which may consist of a resistor 44 and a capacitor 46.

A problem arises in selecting a time constant for the filtering circuit 42. As shown in FIG. 4, the filter time constant is related to the filter ripple amplitude. More specifically, filter circuits having relatively large filter time constants produce a relatively low amount of ripple but result in a relatively unacceptable response time. Conversely, providing relatively smaller filter time constants results in relatively unacceptable ripple amplitudes as shown in FIG. 5. Accordingly, it is relatively difficult to select a filter time constant for an AVR which provides a relatively small amount of ripple voltage and at the same time provide a acceptable response time.

SUMMARY OF THE INVENTION

It is an object of the present invention to provide a control circuit for sensing the terminal voltage of a polyphase electrical generator which solves the problems associated with the prior art.

It is yet another object of the present invention to provide a control circuit for sensing the terminal voltage of a polyphase electrical generator which provides an acceptable response time.

It is yet a further object of the present invention to provide a control circuit for sensing the terminal voltage of a polyphase electrical generator which reduces the amount of ripple voltage of the phase voltages.

Briefly, the present invention relates to an automatic voltage regulator for sensing and controlling the terminal voltage of a separately excited polyphase generator by controlling the field current applied to the field winding. In order to improve the response time of the circuit, the circuitry relies on the phasor relationship between the generator phase voltages to obviate the need for a rectification and filtering circuit used in known AVR's. More specifically, each of the phase voltages is sampled by a sampling circuit. The output signals from the sampling circuit are squared and summed together. The square root of the sum is used to provide a DC voltage signal proportional to the terminal phase voltages $V_A$, $V_B$ and $V_C$. The DC voltage signal may then be compared with a reference signal to generate an error signal for use in regulating the generator terminal voltage by controlling the field current $I_f$ applied to the generator field winding.

DESCRIPTION OF THE DRAWING

These and other objects of the present invention will become readily apparent to those of ordinary skill in the art upon consideration of the following detailed description and attached drawing, wherein:

FIG. 6 is a block diagram of the generator terminal voltage sensing circuitry in accordance with the present invention; and FIG. 7 is a phasor diagram illustrating the relationship of the phase voltages $V_A$, $V_B$ and $V_C$ for a balanced three phase system;

FIG. 8 is exemplary schematic diagram of a sample and hold circuit for use with the present invention;

FIG. 9 is a block diagram of analog to digital converter and a microprocessor for use with the present invention.

DETAILED DESCRIPTION OF THE DRAWING

Figure 1:
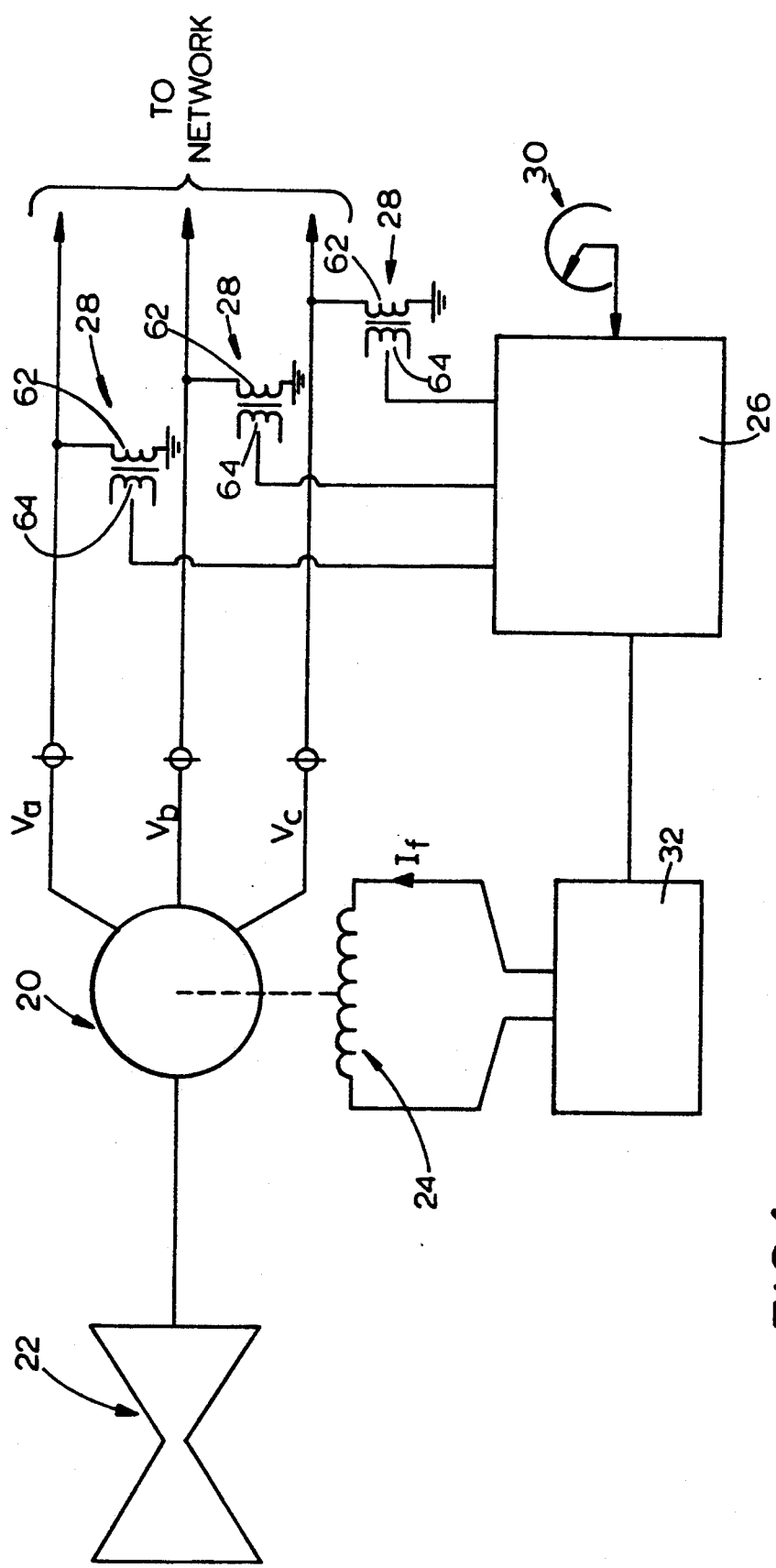
FIG. 1 is a simplified functional block diagram of an excitation control system for a polyphase electrical generator.

The circuitry for sensing the terminal voltage of a polyphase electrical generator in accordance with the present invention is illustrated in FIG. 6. Such, circuitry, generally identified with the reference numeral 48, is used in lieu of the rectification and filtering circuitry 34 (FIG. 2) to provide a DC voltage proportional to the terminal voltage of a polyphase electrical generator. This DC voltage output is adapted to be compared to the terminal voltage reference set point 30 (FIG. 1) to provide an error signal which may be used to control the field current $I_f$ of a generator field winding 24 in a similar manner as discussed above in order to control the terminal voltage of the polyphase electrical generator.

The circuitry 48 for sensing the terminal voltage of the polyphase generator 20 in accordance with the present invention relies on the phasor relationship between the phase voltages $V_A$, $V_B$, and $V_C$ in a balanced three phase electrical system as shown in FIG. 7. As will be shown below in such a balanced three phase electrical system, the square root of the sum of the squares of the phase voltages $V_A$, $V_B$, and $V_C$ yields a DC term that is proportional to the generator terminal voltage which can be used to control the field current $I_f$ applied to the generator field winding 24. More specifically, for a balanced three phase system, the phase voltages $V_A$, $V_B$, and $V_C$, which are 120 electrical degrees apart, may be represented by equations (1), (2), and (3) below.

$$V_A(t) = A \sin(\omega t) \quad (1)$$

$$V_B(t) = A \sin(\omega t + \tfrac{2}{3}\pi) \quad (2)$$

$$V_C(t) = A \sin(\omega t + 4/3\pi) \quad (3)$$

where
A = the amplitude of the sine wave
$\omega$ = the angular frequency of the sine wave; and
$\pi$ = constant equal to 3.1416

The square root of the sum of the squares of the phase voltages $V_A$, $V_B$, and $V_C$ is give in equation (4).

$$S = \sqrt{V_A(t) \cdot V_A(t) + V_B(t) \cdot V_B(t) + V_C(t) \cdot V_C(t)} \quad (4)$$

Expanding each of the products in equation (4) yields:

$$V_A(t) \cdot V_A(t) = A/2\,[1 - \cos(2\omega t)] \quad (5)$$

$$V_B(t) \cdot V_B(t) = A/2\,[1 - \cos(2\omega t + 4/3\pi)] \quad (6)$$

$$V_C(t) \cdot V_C(t) = A/2\,[1 - \cos(2t + 8/3\pi)] \quad (7)$$

Equations (5), (6), and (7) can be further expanded by applying the law of cosines to yield:

$$V_A(t) \cdot V_A(t) = A/2 \cos 2\omega t \quad (8)$$

$$V_B(t) \cdot V_B(t) = A/2 - A/2[\cos 2\omega t \cos 4/3\pi - \sin 2\omega t \sin 4/3\pi] \quad (9)$$

$$V_C(t) \cdot V_C(t) = A/2 - A/2[\cos 2\omega t \cos 8/3\pi - \sin 2\omega t \sin 8/3\pi] \quad (10)$$

The sum of the squares of the phase voltages is then equal to:

$$= A/2\,[3 - \cos 2\omega t \cos 4/3\pi + \sin 2\omega t \sin 4/3\pi + \cos 2\omega t \cos 8/3\pi + \sin 2\omega t \sin 8/3\pi] \quad (11)$$

By substituting values for $\cos 4/3\pi$, $\cos 8/3\pi$, $\sin 4/3\pi$ and $\sin 8/3\pi$, equation (11) becomes:

$$= 3/2\,A \quad (12)$$

The square root of this value is a DC signal, proportional to the generator terminal voltage which can be used in the AVR 26 in lieu of the rectification and filtering circuit 34 to control the filed current $I_f$ of the generator field winding 24 in a manner as discussed above.

Specific embodiments of the circuitry for implementing the present invention described below are merely exemplary. It will be clear to those of ordinary skill in the art that various analog and digital circuitry may be used to implement the present invention all of which are considered to be within the scope of the present invention.

Figure 2:
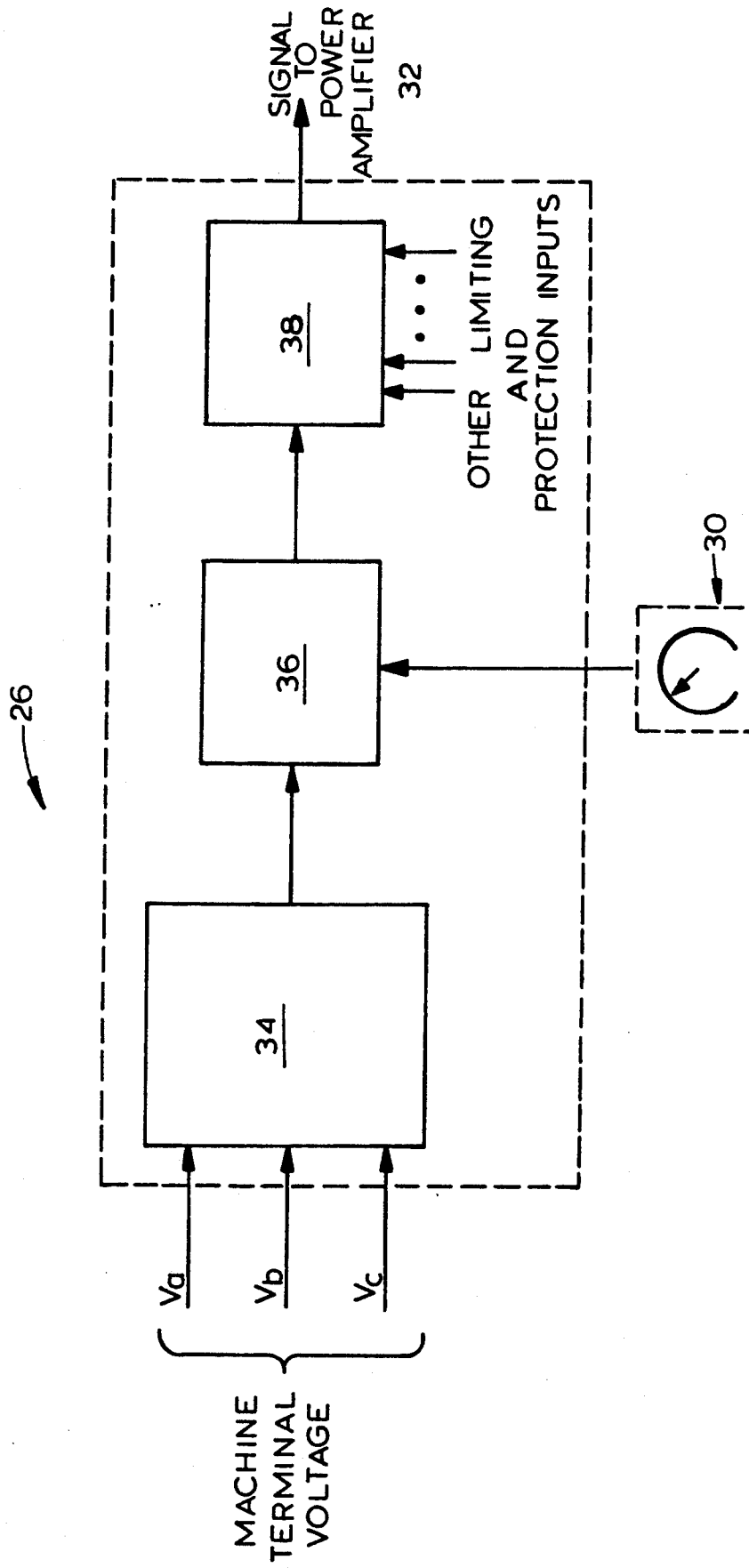
FIG. 2 is a simplified block diagram of a known automatic voltage regulator for a polyphase electrical generator.
Figure 3:
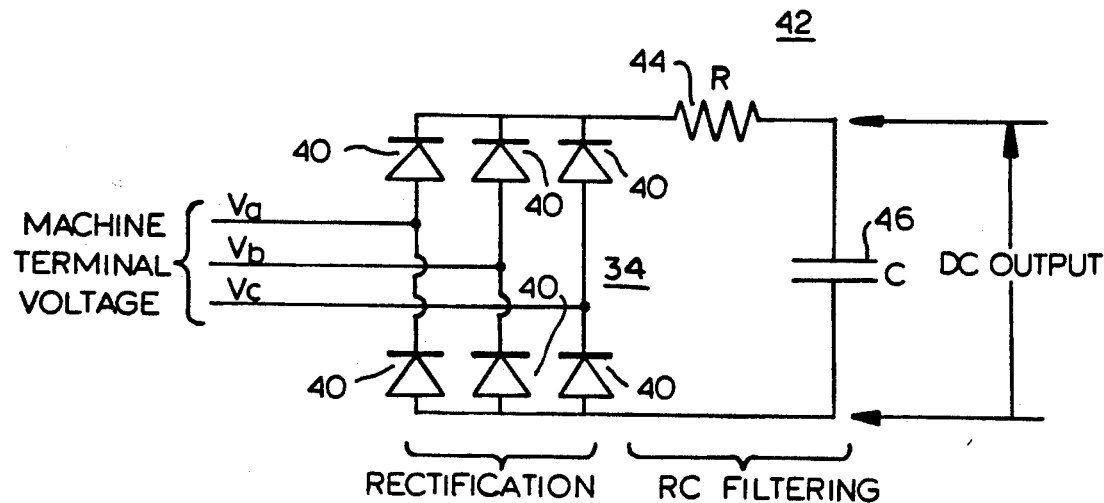
FIG. 3 is a schematic diagram of a rectification and filtering circuit used in known automatic voltage regulators.
Figure 4:
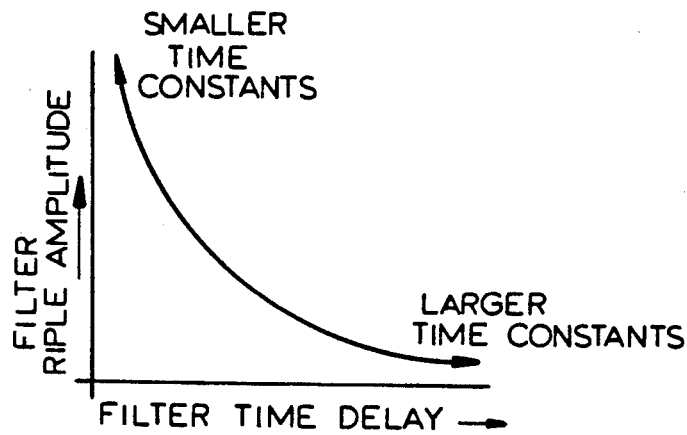
FIG. 4 is a curve of ripple voltage amplitude versus time of response delay for the circuitry illustrated in FIG. 3.
Figure 5:
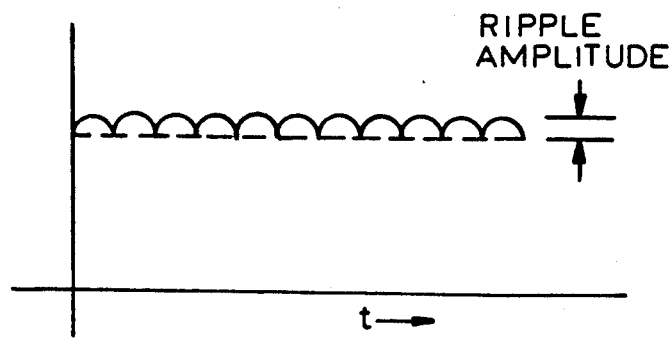
FIG. 5 is a curve of ripple voltage amplitude versus time for the circuitry illustrated in FIG. 3.

The circuitry 48 in accordance with the invention includes sampling circuitry 50, multipliers 52, 54 and 56, a summing junction 58 and a square root circuit 60 (FIG. 6) . The terminal phase voltages $V_A$, $V_B$ and $V_C$ (available at generator phase terminals 59) of the generator 20 applied to the sampling circuitry 50 by way of the potential transformers 28 (FIG. 1). More specifically, each of the potential transformers 28 includes a primary winding 62, and a secondary winding 64. The primary windings 62 are connected between each of the generator phase terminals 59 and ground. Each of the secondary windings 64 is connected to the sampling circuitry 50 (FIG. 6).

The signals available on the secondary windings 64 of the potential transformers 28 are analog signals (e.g. sinusoidal) representative of the phase voltages $V_A$, $V_B$, and $V_C$, available at the generator terminals 59. These analog signals are sampled by the sampling circuitry 50. The sampling circuitry 50 may include a sample and hold circuit 66, such as the circuitry illustrated in FIG. 8. The sample and hold circuit 66 samples the analog signals representative of the phase voltages $V_A$, $V_B$, and $V_C$ at fixed periodic intervals and holds the analog value of the sample for a predetermined period of time. The sampling intervals are normally selected such that the sampling rate is at least twice the frequency of the analog signal being sampled. Since the frequency of the phase voltages $V_A$, $V_B$, and $V_C$ is nominally 60 Hertz, the sampling rate is selected to be at least 120 Hertz, which would result in a sampling interval T every half cycle of the input analog waveform.

Sample and hold circuitry, such as the circuitry 66 illustrated in FIG. 8 is relatively well known in the art. Such circuitry 66 utilizes time and amplitude information of input analog waveform and typically includes a switch 68 and a capacitor 70. The switch 68, which typically may be a field effect transistor or a digital switch, is controlled to sample the input analog waveforms at least every half cycle in order to charge the capacitor 70. The timing control for the switch 68 may be implemented in various ways, both hardware and software, as is known in the art. After a predetermined sampling period the switch 68 disconnects the input analog waveform from the capacitor 70 causing the amplitude of the input analog waveforms during the sampling interval to be stored.

The stored signals, identified as $V_{AT}$, $V_{BT}$ and $V_{CT}$, are applied to the multipliers 52, 54 and 56 and squared. The multipliers 52, 54 and 56 may either be implemented as analog devices or the multiplication may be accomplished digitally. More specifically, in a digital implementation, the sampling circuitry 50 includes an analog to digital converter (A/D) 72 as shown in FIG. 9. The A/D 72 is connected to the output of the sample and hold circuitry 66 to convert the analog output signals to digital signals which, in turn, may be applied to a microprocessor, such as Motorola M6805 which has the capability of performing both 16 bit by 16 bit and 8 bit by 8 bit multiplications. Multiply subroutines for the Motorola M6805 microprocessor are disclosed on pages 47 and 48 of a publication entitled M6805 HMOS M146805 CMOS FAMILY MICROCOMPUTER/MICROPROCESSORS USER'S MANUAL, published by Motorola, copyright 1980, hereby incorporated by reference.

The output signals $(Va_T)^2$, $(Vb_T)^2$ and $(Vc_T)^2$ from the multipliers 52, 54, 56 are applied to the summing junction 58. In an analog implementation, the summing junction 58 may be implemented by various analog devices, such as an operational amplifier. In a digital embodiment of the invention, the summing can be implemented by software by way of the microprocessor 74 as is well known in the art.

The output from the summing junction 58 is then applied to the square root circuit 60. The square root circuit 60 may be implemented in either hardware or software as is known in the art. For example, in a digital implementation, the multiply subroutine could be used to provide a square root function since such a manipulation is merely the converse of squaring. In an analog implementation, known analog circuitry, such as log and analog circuitry could be used to obtain the square root of the signal from the summing junction 58.

The output from the square root circuit 60 may then be applied to the comparator 36 (FIG. 2) and compared with the reference set point 30. The output of the comparator 36 defines an error signal representative of the difference between the reference set point 30 and the output signal from the square root circuit 60. This error signal is then applied to the signal mixing circuitry 38. Such circuitry 38 is generally known in the art and is not part of the present invention. The output signal from the signal mixing circuitry 38 is, in turn, applied to the power amplifier 32 (FIG. 1) to control the field current if applied to the generator field winding 24.

Many modifications and variations of the present invention are possible in light of the above teachings. Thus, it is to be understood that, within the scope of the appended claims, the invention may be practiced otherwise than as specifically described above.

What is claimed and desired to be secured by letters patent of the United States is:

1. An automatic voltage regulator for controlling the terminal voltage of a polyphase electrical generator defining a plurality of phase voltages, comprising:
   receiving means for receiving an signal representative of one of said phase voltages;
   responsive means responsive to said receiving means for squaring said phase voltage signal;
   generating means, responsive to said receiving means for generating a DC signal equal to $\sqrt{3/2}A$ representative of said phase voltages, where A is the amplitude of said phase voltage;
   reference signal means for providing a reference signal;
   error signal generating means, responsive to said generating means and said reference signal means for comparing said DC signal with said reference signal and generating an error signal representative of the difference and;
   controlling means, responsive to said error signal generating means, for controlling said terminal voltage.

2. An automatic voltage regulator as recited in claim 1, wherein said receiving means includes sampling means for sampling said phase voltage amplitude at predetermined time intervals.

3. An automatic voltage regulator as recited in claim 2, wherein said sampling means includes storing means for storing the sampled phase voltage amplitude.

4. An automatic voltage regulator as recited in claim 3, further includes converting means for converting said sampled phase voltage amplitude to a digital signal.

5. An automatic voltage regulator as recited in claim 2, wherein said predetermined time interval is selected to be at a frequency that is at least twice the frequency of said phase voltage representative signal.

6. An automatic voltage regulator for controlling the terminal voltage of a polyphase electrical generator defining a plurality of phase voltages, comprising:
   receiving means for receiving an analog signals signal representative of one of said phase voltages;
   converting means for converting said analog signal to a digital signal related to $\sqrt{3/2}A$, where A is the amplitude of said phase voltage;
   reference signal means for providing a reference signal; and
   error signal generating means, responsive to said converting means and reference signal means, for comparing said digital signal with said reference signal and generating an error signal representative of the difference;
   controlling means responsive to said error signal generating means, for controlling said terminal voltage.

7. An automatic voltage regulation as recited in claim 6, wherein said converting means includes sampling means for sampling said analog signal at predetermined intervals and converting the sampled analog signals to digital signal.

8. An automatic voltage regulator as recited in claim 7, further including digital processing means for processing said digital signal.

9. An automatic voltage regulator as recited in claim 8, wherein said processing means includes a microprocessor.

10. An automatic voltage regulator for controlling the terminal voltage of a polyphase electrical generator defining a plurality of phase voltages comprising:
    receiving means for receiving an analog signal representative of one of said phase voltages;
    sampling means, responsive to said receiving means, for sampling said analog signal at predetermined intervals;

converting means, responsive to said sampling means, for converting the sampled analog signal to a digital signal;

processing means, responsive to said sampling means, for processing said digital signal in accordance with the function $\sqrt{3/2}A$, where A is the amplitude of said phase voltage and generating a digital signal representative of the generator terminal voltage;

reference signal means for providing a reference signal;

error signal generating means responsive to said processing means and said reference signal means for comparing said digital signal and said reference signal and generating an error signal representative of the difference; and controlling means responsive to said error signal generating means, for controlling said terminal voltage.

11. A process for automatically controlling the terminal voltage of a polyphase electrical generator defining a plurality of phase voltages comprising the steps:
  (a) providing a source of signals representative of the phase voltages;
  (b) sampling said phase voltage representative signals for a predetermined time period;
  (c) perform the following function $\sqrt{3/2}A$ where A is the amplitude of said phase voltage to provide a signal representative of the generator terminal voltage signal;
  (d) providing a reference signal;
  (e) comparing said terminal voltage representative signal with said reference signal;
  (f) generating an error signal representative of the difference between said terminal voltage representative signal and said reference signal; and
  (g) utilizing said error signal to control said generator terminal voltage.

12. A process for automatically controlling the terminal voltage of a polyphase electrical generator defining a plurality of phase voltages comprising the steps:
  (a) providing a source of analog signals representative of said phase voltages;
  (b) sampling said analog signals at predetermined time intervals;
  (c) converting the sampled analog signals to digital signals;
  (d) processing said digital signals in accordance with the function $\sqrt{3/2}A$ where A is the amplitude of said phase voltage to provide a signal representative of the generator terminal voltage;
  (e) providing a reference signal;
  (f) comparing said reference signal with said generator terminal voltage representative signal;
  (g) generating an error signal representative of the difference between said terminal voltage representative signal and said reference signal; and
  (h) utilizing said error signal to control the generator terminal voltage.

13. An automatic voltage regulator for controlling the terminal voltage of a balance polyphase electrical generator defining a plurality of phase voltages, comprising:
  receiving means for receiving a source of analog signals representative of said phase voltages;
  converting means including sampling means for sampling said analog signals at predetermined intervals and for converting said analog signals to digital signals; and processing means for processing said digital signals according to a predetermined function given by the following relationship:

$$s = \sqrt{(V_a)^2 + (V_b)^2 + (V_c)^2}$$

where $V_a$, $V_b$, and $V_c$ represent the phase voltages;

reference signal means for providing a reference signal;

error signal generator means, responsive to said converting means and said reference signal means, for comparing said digital signals with said reference signal and generating an error signal representative of the difference; and controlling means responsive to said error signal generating means, for controlling said terminal voltage.

14. An automatic voltage regulator for controlling the terminal voltage of a balance polyphase electrical generator defining a plurality of phase voltages, comprising:
  receiving means for receiving a source of analog signals representative of said phase voltages;
  sampling means, responsive to said receiving means, for sampling said analog signals at predetermined intervals;
  converting means, responsive to said sampling means, for converting the sampled analog signals representative of the phase voltages to digital signals;
  processing means, responsive to said sampling means, for processing said digital signals in accordance with the function $$f = \sqrt{(V_a)^2 + (V_b)^2 + (V_c)^2}$$

where $V_a$, $V_b$ and $V_c$ represent the phase voltages; and generating a digital signal representative of the generator terminal voltage;

reference signal means for providing a reference signal;

error generating means responsive to said processing means and said reference signal means for comparing said digital signal representative of said generator terminal voltage and said reference signal and generating an error signal representative of the difference; and controlling means responsive to said error signal generating means for controlling said generator terminal voltage.

15. A process for automatically controlling the terminal voltage of a balance polyphase electrical generator defining a plurality of phase voltages comprising the steps:
  (a) providing a source of analog signals representative of said phase voltages;
  (b) sampling said analog signals at predetermined time intervals;
  (c) converting the sampled analog signals to digital signals;
  processing said digital signals in accordance with the function $$S = \sqrt{V_A(t) \cdot V_A(t) + V_B(t) \cdot V_B(t) + V_C(t) \cdot V_C(t)}$$

where $V_A(t)$, $V_B(t)$, and $V_C(t)$ represent the phase voltages to provide a signal representative of the generator terminal voltage;

(d) providing a reference signal;

(f) comparing said reference signal with said generator terminal voltage representative signal;

(g) generating an error signal representative of the difference between said terminal voltage representative signal and said reference signal; and (h) utilizing said error signal to control the generator terminal voltage.

* * * * *